US008176331B2

(12) United States Patent
Moreillon et al.

(10) Patent No.: US 8,176,331 B2
(45) Date of Patent: May 8, 2012

(54) METHOD TO SECURE DATA EXCHANGE BETWEEN A MULTIMEDIA PROCESSING UNIT AND A SECURITY MODULE

(75) Inventors: Guy Moreillon, Bioley-Orjulaz (CH); Nicolas Fischer, Versoix (CH); Nikolai Keychenko, Lausanne (CH); Joel Wenger, Mies (CH)

(73) Assignee: Nagravision SA, Cheseaux-sur-Lausanne (CH)

( * ) Notice: Subject to any disclaimer, the term of this patent is extended or adjusted under 35 U.S.C. 154(b) by 936 days.

(21) Appl. No.: 11/591,555

(22) Filed: Nov. 2, 2006

(65) Prior Publication Data

US 2007/0101149 A1    May 3, 2007

(30) Foreign Application Priority Data

Nov. 3, 2005 (EP) ..................................... 05110316

(51) Int. Cl.
*G06F 21/00* (2006.01)
(52) U.S. Cl. ........................................... 713/182; 726/2
(58) Field of Classification Search .................. 713/182; 726/2, 27
See application file for complete search history.

(56) References Cited

U.S. PATENT DOCUMENTS

| 6,363,149 | B1 * | 3/2002 | Candelore | 380/45 |
| 7,092,729 | B1 * | 8/2006 | Fichet et al. | 455/466 |
| 2002/0184506 | A1 * | 12/2002 | Perlman | 713/182 |
| 2004/0088558 | A1 | 5/2004 | Candelore | |
| 2005/0111666 | A1 * | 5/2005 | Blom et al. | 380/277 |
| 2006/0143705 | A1 * | 6/2006 | Sentoff | 726/19 |
| 2007/0060103 | A1 * | 3/2007 | Patterson et al. | 455/410 |
| 2007/0186111 | A1 * | 8/2007 | Durand | 713/176 |

FOREIGN PATENT DOCUMENTS

WO    2005/081526    9/2005

* cited by examiner

*Primary Examiner* — Vivek Srivastava
*Assistant Examiner* — Anthony Brown
(74) *Attorney, Agent, or Firm* — Harness, Dickey & Pierce, P.L.C.

(57) ABSTRACT

A method for protecting multimedia data exchanged between a multimedia processing device and a security module managed by a management center, the multimedia processing device receiving an encrypted multimedia data, decrypting the encrypted multimedia data and converting the decrypted multimedia data, said multimedia processing device including a personal key, the method comprising obtaining an identifier pertaining to an entity representing a group of multimedia processing devices, calculating a security key formed by a one-way function based on the personal key of the processing multimedia device and the entity identifier, transmitting this security key and the entity identifier to the security module connected to said multimedia processing device, calculating the security key using a one-way function based on the personal key of said multimedia processing device and the entity identifier, and using the calculated security key to secure the data exchanged between the multimedia processing device and the security module.

9 Claims, 1 Drawing Sheet

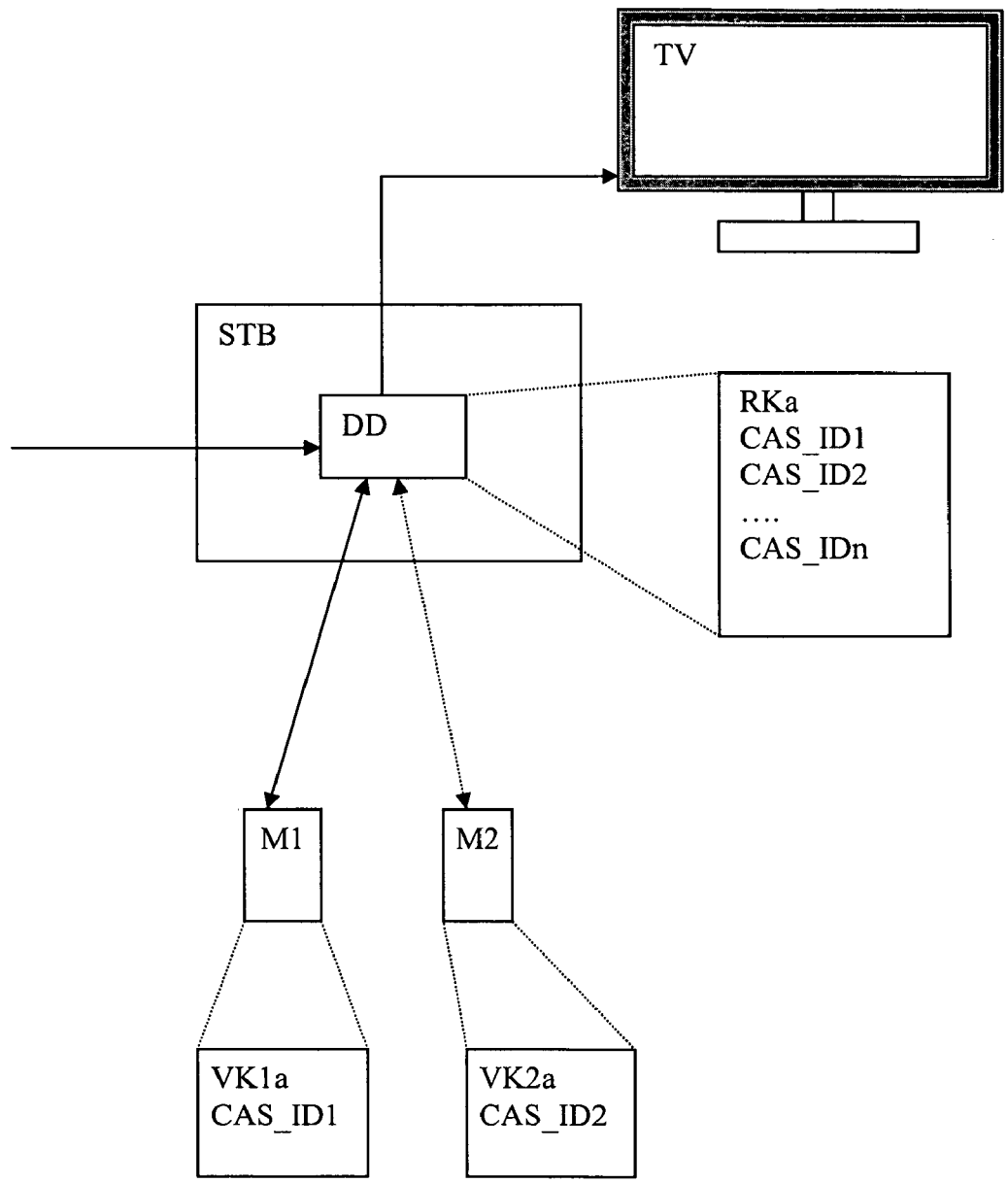

US 8,176,331 B2

METHOD TO SECURE DATA EXCHANGE BETWEEN A MULTIMEDIA PROCESSING UNIT AND A SECURITY MODULE

PRIORITY STATEMENT

The present application hereby claims priority under 35 U.S.C. §119 on European patent application number EP 05110316.6 filed Nov. 3, 2005, the entire contents of which is hereby incorporated herein by reference.

INTRODUCTION

Embodiments of the present invention generally relates to the domain of Pay-TV decoders, in particular to decoders with a security module to secure the authorization functions.

STATE OF THE ART

A Pay-TV decoder includes schematically a receiver capable of receiving and formatting signals from different sources such as satellite, cable or IP network; a filtering unit capable of extracting one or more data streams among the multitude of possible streams; a central unit in charge of managing the decoder and for enabling the user interface; a modulator for transmitting the signals in plain text towards a visualization device; as well as a deciphering and decompression module that receives the encrypted data stream originating from the filtering unit and transmits the data in clear to the demodulator, this module having the task of deciphering the data stream and decompressing said data according to a standard format such as DVB.

It should be noted that physically, the deciphering and decompression module is placed on the same support as the modulator in such a way that the data in clear is not accessible after deciphering. This type of decoder is linked to a security unit that can take several forms such as a smart card, a SIM card or any form of electronic module whose connection with the decoder can either be with or without contacts.

A decoder can take numerous forms such as the well known apparatus placed alongside the television set (Set-top-box) but can also take the form of portable devices, such as a Palm, third generation telephones or an iPod™.

In order to ensure the security of the exchanges between the security module and the decoder, the data transmitted by the security module is encrypted by a key pertaining to each decoder. This type of solution is described in the document WO99/57901A1. The keys necessary for the decryption of audio or video content are thus extracted from security messages that only this module can decrypt after verification of the rights.

These keys or control words are encrypted with a key pertaining to the security module/decoder pair and transmitted to the decoder.

In order to reinforce the security in particular in the decoder, the control words are only decrypted in the deciphering module. Each of these modules comprises its own key which is communicated to the security module by secure means managed by a management center. A example is also disclosed in the document WO2004/010698 in which a deciphering key is directly located in the deciphering module of the stream, this key allowing the keys sent by a security module to be decrypted.

The establishment procedures of an encryption key of the channel between the decoder and the security module are based on the knowledge of a common secret (see document WO03107585). Therefore, if a decoder must be able to receive data from several security modules, each module must dispose of the initial secret in order to create this secure channel.

With the increasing need for interactivity, it has become necessary to open the use of one decoder to several operators or several entities, an entity constituting a group of decoders connected by the same common denominator (regional, type of contract, software version etc.). Of course, this architecture forces the dissemination of the secret key of the deciphering module among the different entities. If one of the entities is the object of a leak, it is possible to imagine the damage that it creates not only for this entity but also for all entities.

SUMMARY

An aim of an at least one embodiment of present invention is to propose a method for the creation of a secure and authenticated channel between a multimedia processing device and a security module that can be shared between several entities, the data transmitted to one entity not compromising the other entities.

In at least one embodiment, a protection method is for data exchanged between a multimedia processing device and a security module managed by a management center, the multimedia processing device comprising a personal key, this method comprising:

- determination of an identifier pertaining to an entity representing a group of multimedia processing devices,
- calculation of a security key formed by a one-way operation based on the personal key of the multimedia processing device and the identifier of the entity,
- transmission of this security key to the security module connected to said entity,
- formation of a security key between the multimedia processing device and the security module, by means of the reception of the entity identifier by the multimedia processing device,
- calculation by the multimedia processing device of the security key by a one-way operation based on the personal key of said multimedia processing device and the entity identifier,
- use of this key to secure the data exchanged between the multimedia processing device and the security module.

Therefore, a different security key is generated for each security module group allowing dialogue with the same multimedia processing device. This has the advantage that any given entity does not dispose of the personal key of the multimedia processing device but still being able to exchange data in a secure way with said security module.

The one-way function can be of different types such as for example a hashing function (SHA, MD2, MD5, HMAC), a hashing function with a key (HMAC) or an encryption function, the operator identifier being encrypted by the personal key of the multimedia processing device.

BRIEF DESCRIPTION OF THE DRAWINGS

The invention will be better understood thanks to the following detailed description that refers to an embodiment and an annexed FIGURE, given as a non-limitative example and representing an example multimedia processing device that can be connected to two security modules.

DETAILED DESCRIPTION OF THE EXAMPLE EMBODIMENTS

The detailed description refers to FIG. 1. The scope of this invention is the possibility of securing a communication channel by enabling the management by a management center. This management center disposes of the list of personal keys relating to the multimedia processing devices. Hereinafter, reference will be made to an STB (set-top-box) such as disclosed in FIG. 1.

This STB comprises a deciphering and decompression module DD that receives the multimedia data in the encrypted form and which processes this data so that it can be used by a visualisation device such as a television TV.

In order to carry out the decryption of the data, it is necessary to dispose of decryption keys that are provided by a security module M. The channel between the security module M and the module DD is encrypted by one security key in order to avoid a security key from being used by more than one decoder. The method for generating this key is described here.

A management center is requested to establish the security parameters between a given entity and a decoder. The first operation is to give to this entity an identifier CAS_ID that pertains to it. The second operation is to identify a decoder and therefore retrieve its personal key RK.

On the basis of these two pieces of information, the management center will calculate a security key VK by means of a one-way function using these two pieces of information. The simplest solution is a hashing function (HASH) on the block made up of the entity identifier and the personal key (HMAC). This result constitutes the security key VK and the knowledge of this key by the entity does not permit the personal key RK to be found.

This security key VK is then loaded into the security module M, either on initialization, during an activation stage or by sending management messages by the entity, via the multimedia data.

In order for a decoder to be able to generate the security key VK, it must know the entity identifier CAS_ID. This piece of information can be obtained in several ways, for example by means of the extraction of data that is in the multimedia data stream. In the case that this decoder is intended to receive a data stream from one single source, it is possible to place the piece of information from the entity identifier in this stream.

According to another embodiment, it is the security module M that will transmit this piece of information to the deciphering and decompression module DD. This second method was chosen to illustrate the present application without excluding the functionality according to the first method.

When a security module wishes to dialogue with a STB decoder, for example the module M1, and in particular with its deciphering and decompression module DD, this module sends its entity identifier CAS_ID1 to the deciphering and decompression module DD. The latter will calculate the same one-way function that was carried out by the management center and will obtain the security key VK1$a$. This key is used to decrypt the data received from the security module M1. If this module does not dispose of this key to encrypt the data, the data obtained from the decryption and decompression module DD will be incomprehensible. In order to avoid any degradation of the hardware, it is possible to add a verification stage as soon as security key is determined by the deciphering and decompression module DD. Therefore, it is specified that the next message produced by the security module comprises a reference value (for instance 01010101B) encrypted by the security key VK1$a$. If this value is not received by the deciphering and decompression DD module, all processing is interrupted. In a more elaborate method, the deciphering and decompression module DD generates a random number N and encrypts it with the security key and sends this cryptogram to the security module. The latter decrypts the cryptogram to obtain the random number N. It applies a know function on the random number (an addition, subtraction, XOR etc.) to obtain N'. The security module encrypts N' with the security key and sends this cryptogram to the deciphering and decompression module DD. The latter decrypts the cryptogram and verifies the relation between the random number generated N and that received N'. If the relation is that which has been agreed, this means that the two parts dispose of the same key.

According to one embodiment, the entity identifier can be extended to a security module identifier. In fact, the management center knowing the decoder concerned and thus its deciphering and decompression module DD and the security module which is intended to interact with this decoder, can generate a security key which would be a function of a security module identifier and the personal key of the deciphering and decompression module DD. This function creates a match between the security module M1 and the decryption and decompression module DD.

According to one variant of this embodiment, the security module identifier is made up of two parts, namely an entity identifier and an identifier pertaining to this module in the classification of the entity.

This method for encoding the identifier will be useful for the embodiments involving the verification of the identifier in a list, only the part of the identifier related to the entity will be verified by the deciphering and decompression module DD.

According to another embodiment, the deciphering and decompression module DD comprises verification means of the conformity of the security module M to which it is connected. To this effect, the deciphering and decompression module DD includes a list of the identifiers admitted for the creation of the security key as disclosed in FIG. 1 by the list of CAS_ID. In this case it is called positive since it comprises the valid CAD_ID or it can be negative as it comprises the list of the prohibited CAD_ID.

There are numerous methods for managing this list and only a limited number of methods will be explained.

Fuse List

Firstly, each deciphering and decompression module DD comprises a list of, for example, 100 identifiers CAD_ID1 . . . CAS_ID100. The management center can insert deactivation controls of one or several identifiers into the multimedia data stream that serve to erase definitively one or more identifiers. As a consequence these identifiers will no longer be admitted to create a security key with a security module.

These deactivation commands are preferably encrypted or signed by a key that will be common to all the deciphering and decompression modules DD.

Evolutionary List

The multimedia data stream includes information (instruction) allowing this list to be formed. Initially, no identifier is admitted (possibly an identifier by default CAD_ID1) and the control instructions allow the programming of the authorised identifiers or the removal of the revoked identifiers. The result of these instructions is stored in a non-volatile memory. As previously, these instructions are preferably encrypted or signed by a key common to all the deciphering and decompression modules DD.

According to one embodiment, the deciphering and decompression module DD includes a volatile memory that is empty at the time of each power on. Therefore, this memory is loaded with the identifiers received in the current multimedia data stream. This allows a multimedia data stream to be linked to a given set of entity identifiers. These identifiers are placed in a table and form part of the data stream SI. Therefore, it is possible to allow this table to develop during a diffusion session and with it, the list of authorised entities. The deciphering and decompression module DD stores the entity identifier with which it can create a security key and when the table of identifiers changes, it verifies that the current identifier is always included in the new table. If not, it stops the reception of the data transmitted by this security module and requests a new initialization stage of the security key.

The invention claimed is:

1. A method, managed by a management center, of securing multimedia data exchanged between a multimedia processing device and a security module, the multimedia processing device receiving an encrypted multimedia data, decrypting the encrypted multimedia data and processing the decrypted multimedia data for display, said multimedia processing device including a personal key, the method comprising:

obtaining, by the multimedia processing device from the management center, an identifier of an entity representing a group of multimedia processing devices, calculating, by the management center, a security key formed by a one-way encryption function based on the personal key of the multimedia processing device and the entity identifier, transmitting, by the management center, this security key and the entity identifier to the security module connected to said multimedia processing device, calculating the security key, by the multimedia processing device, using the one-way encryption function based on the personal key of said multimedia processing device and the entity identifier, securing the multimedia data exchanged between the multimedia processing device and the security module using the calculated security key, verifying the identity of the security key in the security module, and in the deciphering and decompression module in which the personal key is initialized, by the encryption with said security key of a message containing at least one part predefined by the security module, and verifying this predefined part after decryption by the deciphering and decompression module, wherein the entity identifier is obtained by the transmission of said identifier by the security module.

2. Method according to claim 1, wherein the entity identifier is obtained by the extraction of said identifier from the encrypted multimedia data received by the multimedia processing device.

3. Method according to claim 1, wherein the one-way encryption function is at least one of a hash function and hash MAC function.

4. Method according to claim 1, wherein the one-way encryption function is an encryption function of the entity identifier by the personal key.

5. Method according to the claim 1, wherein the deciphering and decompression module comprises a list of entity identifiers, this deciphering and decompression module verifying the conformity of the identifier received from the security module in comparison with this list.

6. Method according to claim 5, wherein the multimedia processing device receives multimedia data comprising the data allowing this list of identifiers to be formed.

7. Method according to claim 5, wherein the deciphering and decompression module includes a key to decrypt or verify the signature of the data of the list transmitted.

8. Method according to one of the claim 5, wherein the list of identifiers is called a positive list when the list includes identifiers authorized for the creation of the personal key.

9. Method according to one of the claim 5, wherein the list of identifiers is called a negative list when the list includes identifiers prohibited for the creation of the personal key.

* * * * *